United States Patent [19]

Kleiner et al.

[11] 4,393,660
[45] Jul. 19, 1983

[54] QUIESCENT FORMATION OF GASIFIED ICE PRODUCT AND PROCESS

[75] Inventors: Fredric Kleiner, New City, N.Y.; Valery B. Zemelman, Wilton, Conn.

[73] Assignee: General Foods Corporation, White Plains, N.Y.

[21] Appl. No.: 278,233

[22] Filed: Jun. 29, 1981

[51] Int. Cl.³ .............................................. F25C 1/18
[52] U.S. Cl. ............................................ 62/69; 62/1; 261/140 R; 261/DIG. 7
[58] Field of Search ....................... 261/DIG. 7, 140 R; 62/1, 48, 69, 70, 320; 137/12, 5

[56] References Cited

U.S. PATENT DOCUMENTS

| | | | |
|---|---|---|---|
| 2,514,463 | 7/1950 | Bayers, Jr. ............... | 261/140 R X |
| 2,575,509 | 11/1951 | Bayston ..................... | 62/69 X |
| 2,975,603 | 3/1961 | Barnes et al. .............. | 62/1 |
| 3,000,189 | 9/1961 | Bert .......................... | 62/320 |
| 3,086,370 | 4/1963 | Barnes et al. .............. | 62/1 |
| 3,217,503 | 11/1965 | Mitchell et al. ............ | 62/48 |
| 3,220,204 | 11/1965 | Adler et al. ................ | 62/70 |
| 3,255,600 | 6/1966 | Mitchell et al. ............ | 62/69 |
| 3,333,969 | 8/1967 | Mitchell et al. ............ | 99/192 |
| 3,479,835 | 11/1969 | Lane et al. ................. | 62/69 X |
| 3,552,726 | 1/1971 | Kraft ......................... | 261/140 R X |
| 4,105,725 | 8/1978 | Ross .......................... | 261/DIG. 7 |
| 4,285,977 | 8/1981 | Yezek et al. ............... | 62/48 X |

Primary Examiner—William E. Tapolcai
Attorney, Agent, or Firm—Joyce P. Hill; Thomas R. Savoie; Daniel J. Donovan

[57] ABSTRACT

The present invention provides a gasified ice product characterized by a granular, crystalline, porous structure, a brittle texture, good stability in its frozen state, and the ability to rapidly and quietly release its gas content to aqueous solution upon melting therein. The process calls for contacting an aqueous liquid with finely-dispersed bubbles of a conditionally-stable-hydrate-forming gas, such as carbon dioxide, under conditions of temperature and pressure and for a time effective to form a suspension of gas hydrate crystals in the liquid, and then freezing the suspension. The finely-dispersed bubbles of gas are preferably admitted through a porous metal sparger positioned at the bottom of a pressurized reaction vessel. The resulting product preferably has a bulk density of less than 0.60 grams per cubic centimeter and contains from about 30 to about 70 milliliters of gas per gram of product. According to one preferred form of the invention, the product is granulated.

4 Claims, 1 Drawing Figure

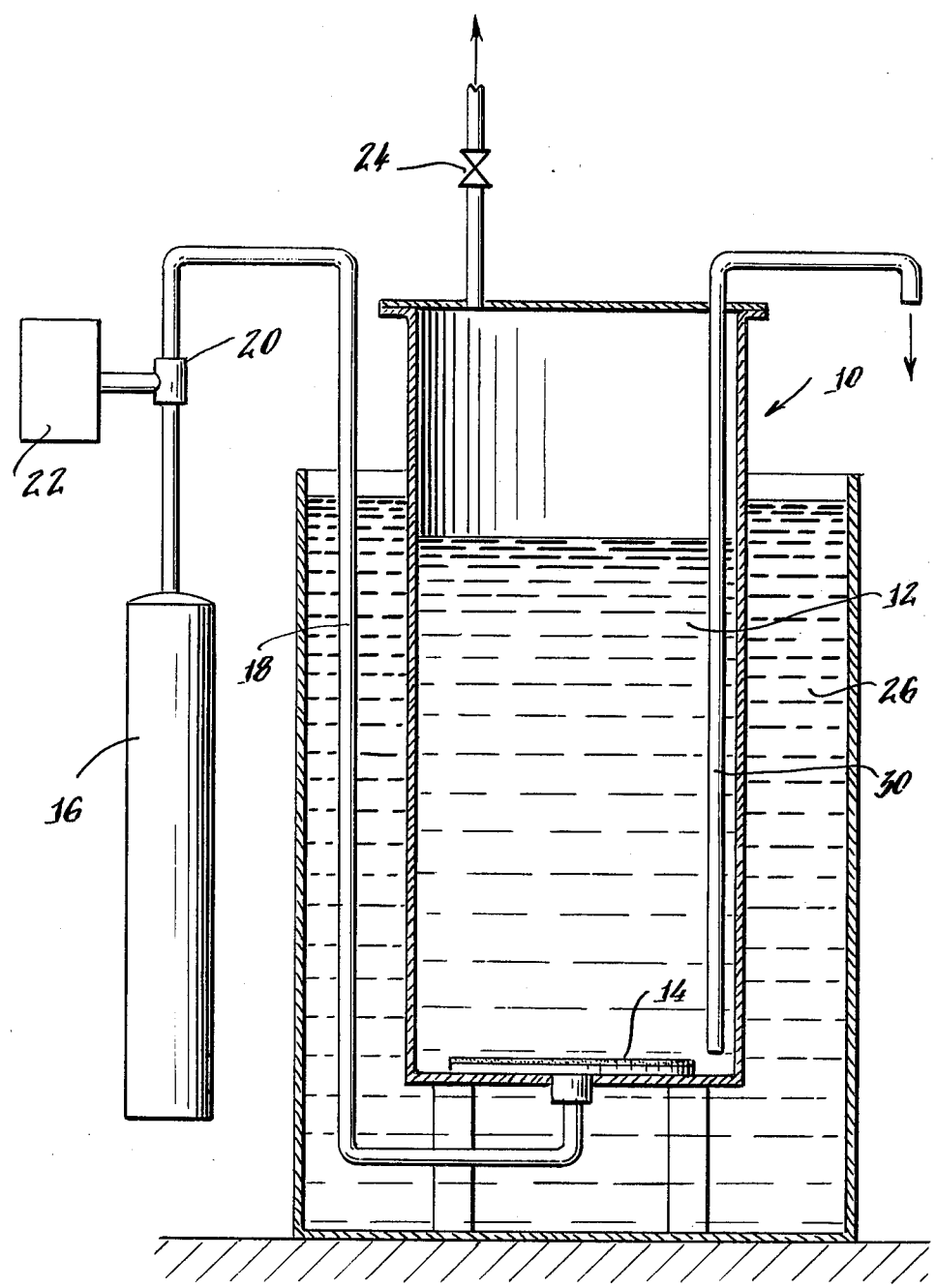

QUIESCENT FORMATION OF GASIFIED ICE PRODUCT AND PROCESS

TECHNICAL FIELD

The present invention relates to gasified ice products and their preparation; and particularly, to improvements which provide products of this type characterized by granular, crystalline, porous structures, brittle textures, good stability in their frozen state, and the ability to rapidly and quietly release their gas contents in aqueous solution upon melting therein.

Gasified ice products are known which, due to the binding of the gas within a chemical hydrate complex, have enabled delivery of high volumes of gas from relatively small volumes of ice. These products have shown potential for storage and transport of gases of many types. Typically, the gas will be carbon dioxide and the product will be employed to carbonate an aqueous liquid in the simplified home preparation of carbonated beverages. For the greatest economy and convenience, it is desirable to incorporate high levels of gas in a product which will remain stable for long periods of storage and then rapidly release the gas into an aqueous liquid with essentially no popping or splattering. Unfortunately, it has been difficult in the past to achieve products having this desired combination of properties.

In its simplest form, the process for preparing gasified ice products has comprised contacting an aqueous liquid with a conditionally-stable-hydrate-forming gas under high pressure in a reaction vessel for a period of time sufficient to form a desired level of gas hydrate, and then cooling to freeze the remaining unreacted liquid and entrap gas hydrate. The usual result of these high pressure processes was the entrainment of large pockets of gaseous material in either the free gaseous or liquid state. Such large pockets of entrained gas can fracture the frozen liquid that encapsulates it, resulting in uneven and sometimes explosive gas release while in frozen storage at atmospheric pressure and when the product is placed in water for use. Moreover, it can be hazardous where the gasified ice product contains a chlorine gas hydrate, and chlorine gas is released during frozen storage or in an explosive manner when placed in water.

Another disadvantage of prior procedures was the use of separate vessels for gasifying the aqueous liquid to form a desired level of gas hydrate, and for cooling the reaction product to freeze unreacted liquid and entrap gas hydrate. Large losses in carbon dioxide, high energy consumption, large capital equipment cost, and substantial production time and labor costs associated with prior art procedures, have presented major deterrence to commercialization of products of this type with all the attendant advantages.

BACKGROUND ART

Barnes et al in U.S. Pat. Nos. 2,975,603; 3,086,370; and 3,217,503 disclosed a process for producing gasified ice products such as carbonated ice which were characterized by high volumes of carbon dioxide and storage lives as long as 33 days. These patents taught that carbonated ice products of this type had the stability to form superior effervescent beverages upon mixture with aqueous liquid. According to one aspect of the disclosure, a carbonated ice was prepared by subjecting aqueous liquid to a carbon dioxide pressure of at least about 200 psig and preferably less than 600 psig; maintaining the aqueous liquid and the carbon dioxide in contact for a time sufficient to permit absorption in the liquid of carbon dioxide in bound form in the formation of ice containing at least about 25 to 27.5 milliliters of carbon dioxide per gram of ice; and withdrawing the carbonated ice from the chamber in frozen form.

The product produced in this manner would typically contain pockets of gaseous and liquid carbon dioxide which caused cracking or explosive failure in water. As a partial remedy to this problem, Barnes et al suggested degassing or stabilizing the product for a period of about 24 hours at about −10° C. They disclosed that during this period, any carbon dioxide which may be loosely held within the product is evolved, and that liquid carbon dioxide would generally volatilize and pass from the solid product. Upon testing, it is disclosed that the degasified carbonated ice produced a vigorous evolution of gas when placed in water. The average bubble size and quantity of bubbles were said to give the resulting beverage the appearance of the familiar "club soda" carbonated drink. Experience has shown, however, that this vigorous evolution typically includes popping and cracking upon placement in water with the resultant splashing of water from the container. Moreover, in order to remove the product from the pressure reactor, it is necessary to chip or chisel the ice out of the reactor vessels, making the production of commercial size quantities extremely difficult, especially where the resulting product is of very uneven dimensions. Attempts to granulate or crush products prepared in this manner also require great amounts of energy and significantly diminish the stability of the resulting product.

U.S. Pat. No. 3,086,370, also to Barnes et al, discloses that in addition to carbon dioxide, gasified ice products containing other gases such as nitrous oxide, certain sulfur-containing gases, certain chlorine-containing gases, various inert gases and carbon monoxide could be formed. Because this patent was based upon a continuation-in-part application of U.S. Pat. No. 2,975,603 (Barnes et al, supra), much of the same disclosure regarding pressures and degasing of the solid ice product is carried forward. Significantly, the produts produced according to this disclosure are also relatively dense solids formed in a reactor which makes removal difficult, and exhibit serious problems of popping and cracking when placed in water.

A similar disclosure is found in U.S. Pat. No. 3,217,503, which again was a continuation-in-part of the application which resulted in the first-mentioned Barnes et al patent. This patent, however, describes in more detail the method for handling and transporting gasified ice to a desired point of liberation under atmospheric pressure while maintaining it at a temperature below its melting point. Again, the product is of the type described in the other two Barnes et al patents and is made by a process which would be extremely difficult to employ on a commercial scale.

Alder et al in U.S. Pat. No. 3,220,204 stated that while the prior art procedures of Barnes et al produce products which retain significantly high levels of carbonation during frozen storage, they noted that the products had a tendency to explode or pop (i.e., break apart and disintegrate with a loud noise) at an unpredictable point of time during dissolution. They indicated that when the Barnes et al carbonated ice products were added to water or milk, they frequently exploded in the glass. Products of this type have extremely limited commercial value.

Their solution to the problem entailed providing a high liquid-surface-to-gas contact during preparation of the hydrate. To achieve this, they employed a thin film of water which was subjected to carbon dioxide gas at a pressure and temperature above the eutectic point of the water and at a temperature low enough to form a hydrate. A suspension of hydrate in aqueous liquid was then transferred to a freezing zone and was converted to a stable form by freezing at a temperature below $-3°$ C. After freezing, the product was then removed from the molds and cut into sections of the desired length. Our experience has shown that products prepared in this manner would not only require added equipment, energy and time to transfer the product from a reactor to a freezing chamber, but that demolding or removing the product from the freezing chamber was also a source of difficulty. Typically, removing the product from the freezing chambers requires briefly heating the exterior surface of the chamber to melt the outer surface of the product to permit the cylindrical shape to be removed. This required added energy costs in that it is necessary to heat the cooled mold for demolding and then recool the mold for the next freezing operation. Additionally, this procedure has the disadvantage that carbon dioxide is released during heating.

In U.S. Pat. No. 3,255,600 to Mitchell et al, there is disclosed a process for forming carbonated ice wherein liquid carbon dioxide and liquid water are mixed under controlled conditions to form the carbonated ice product. The inventors indicate that they have discovered that liquid carbon dioxide results in a more rapid formation of the product while permitting more accurate control of the operating conditions. It has been our experience, however, that the use of liquid carbon dioxide requires the use of great quantities of energy and produces a product which has the popping and cracking problems associated with the earlier prior art.

As disclosed in Mitchell et al in U.S. Pat. No. 3,333,969, the problem of uneven release of carbon dioxide has persisted throughout this evolution of gasified ice products. They indicate that an important problem present in the handling and use of carbonated ice, particularly in the lower portion of the 10 to 118- volume range, was the uneven release of carbon dioxide from carbonated ice. They stated that this problem manifested itself in minor explosions or popping which, while not of a dangerous nature, where the gas is carbon dioxide, but may disturb the user and splatter the liquid in which it is placed. Mitchell et al propose subdividing carbonated ice into discrete particles while maintaining the temperature of the ice below 0° C., and then compacting the discrete particles to form them into adhered mass or briquette. Briquetting did produce a gasified ice product having a commercially-satisfactory mechanical strength in the frozen state and also liberated entrained gas bubbles which are believed to cause the undesirable, spontaneous popping and exploding phenomena; however, because of the density of the starting gasified ice products, subdividing required large amounts of mechanical work and resulted in significant losses in carbon dioxide.

It is apparent from the foregoing discussion of the prior art that the problem of uneven and sometimes explosive release of gas from gasified ice products have troubled those skilled in the art. While the earlier patents indicated that the problem was particularly acute with regard to products containing high volumes of carbon dioxide or other gases, the later prior art indicated that the problem also persisted with regard to lower, more moderate gas-containing products.

Moreover, all of the prior art procedures have required high shear mechanical mixing or the use of more complicated equipment to obtain gas contact with a thin film of liquid to achieve the desired high level of gas liquid contact. Employing procedures of this type required large amounts of energy to be expended in imparting the necessary amount of mechanical work. Additionally, the disclosed techniques for freezing the resulting gas hydrate suspensions and removing them from the chamber in which they were frozen, whether it be the reaction vessel or another vessel, was also more complicated than would be desired.

Thus, there remains a definite need for an efficient, economical process which enables the production of a gasified ice product having a satisfactory level of gas content; which remains stable during storage, yet releases the gas rapidly upon melting in an aqueous liquid without popping or splashing.

DISCLOSURE OF INVENTION

In accordance with the present invention, we provide an improved process for preparing gasified ice products characterized by a granular, crystalline, porous structure, a brittle texture, good stability in the frozen state, and the ability to rapidly and quietly release gas upon melting in an aqueous solution. Also provided is the improved product having these characteristics.

In its broad aspects, the process comprises: maintaining aqueous liquid in a pressurized vessel under conditions of temperature and pressure effective to form a stable gas hydrate upon contact with a conditionally-stable-hydrate-forming gas; introducing finely-dispersed bubbles of a conditionally-stable-hydrate-forming gas into said aqueous liquid, at a pressure above that within said vessel to contact said liquid with the said gas; constantly withdrawing gas from said vessel to maintain substantially constant pressure within and flow rate through said vessel; maintaining said contact for a period of time effective to form a suspension comprising gas hydrate dispersed within said liquid; and freezing said suspension under pressure. It is further noted that the process of this invention produces a gas hydrate product without mechanical agitation of the reactants.

The product, in its broad aspects, comprises: a solid suspension of a stable gas hydrate within a continuous matrix of solid ice, having a bulk density of less than about 0.60 grams per cubic centimeter.

In carrying out the process of this invention, the gasified ice products will preferably be prepared from water. Although some advantages in terms of reproducibility of precise conditions and stability of the final product may be obtained by using distilled or deionized water, the process of the present invention is not limited to these. The person of ordinary skill in the art may employ various types of solutions, and in the case of food products such as beverages, various materials including sugar, color, flavor, acidulents, and the like, knowing that the ease of process control or the stability of the final product may be decreased. Thus, the terms "water" and "aqueous liquid" will be hereinafter employed to include water containing added materials such as those mentioned, as well as water per se.

Among the gases which are capable of forming conditionally-stable-hydrates are those which form hydrates which appear to be characterized by a molecular complex between the gas and water under controlled conditions of temperature and high pressure. All of the suitable gases exist in the gaseous state at atmospheric pressure at temperatures above 0° C. Additionally, these gases combine with water to form gas hydrates containing six or more molecules of water per mole of gas. The hydrates are further characterized by the ability to be stored in an essentially stable condition at a temperature below about 0° C. and then be decomposed by melting in an aqueous liquid.

Specifically identified as gases capable of forming conditionally-stable hydrates are various oxides of non-metals, typically nitrous oxide; sulfur-containing gases including hydrogen sulfides; chlorine-containing gases, including chlorine and methylene chloride; various inert gases such as helium, argon, krypton, and neon; carbon monoxide; and carbon dioxide. Preferably, the gas will be selected from the group consisting of these, and most preferably will comprise carbon dioxide, nitrous oxide or chlorine due to their adaptability to the process and their widespread utilities. While not intending to be bound to the specific example of carbin dioxide, the present detailed description will focus on this as exemplary, due to its ready adaptability to use in preparing carbonated beverages for which there appears to be an immediate commercial opportunity.

BRIEF DESCRIPTION OF THE DRAWING

The present invention will be better understood and its advantages will become more apparent when the following detailed description is read in light of the accompanying drawing wherein:

The FIGURE is a schematic representation of a preferred processing arrangement.

BEST MODE FOR CARRYING OUT THE INVENTION

The present invention provides a gasified ice product characterized by a granular, crystalline, porous structure, a brittle texture, good stability in its frozen state, and the ability to rapidly and quietly release its gas content to an aqueous solution upon melting therein. The following description will discuss a preferred process where, in the preparation of carbonated ice, an aqueous liquid is maintained in a pressurized vessel under conditions of temperature and pressure effective to form a stable carbon dioxide hydrate upon contact with carbon dioxide, introducing carbon dioxide into the liquid as finely-dispersed bubbles to contact said liquid with the carbon dioxide, constantly withdrawing carbon dioxide from the vessel to maintain a substantially-constant pressure within it, maintaining the contact for a period of time effective to form a suspension comprising carbon dioxide hydrate dispersed within the aqueous liquid, and freezing the suspension under pressure.

Reference to the FIGURE shows a pressurized vessel 10 containing an aqueous liquid 12. The aqueous liquid 12 will be maintained within the vessel 10 under conditions of temperature and pressure effective to form a stable gas hydrate upon contact with a suitable gas such as carbon dioxide, the preferred conditionally-stable-hydrate-forming gas. To achieve the stable hydrate, the temperature must be below that at which the gas hydrate decomposes at the existing pressure in the system. The pressure during contact for hydrate formation is preferably high to obtain the desired high gas content within a commercially practical period of time.

While pressures of 350 psig and lower can be employed with satisfactory results, it is preferred to employ greater pressures during the contact; preferably, at a level of from about 400 to about 650 psig. The reason for this is that the higher the pressure is during contact, the less contact period is required. A particularly preferred pressure range will be from about 450 to about 600 psig.

Carbon dioxide or other suitable gas is introduced into said aqueous liquid 12 as finely-dispersed bubbles. Referring to the FIGURE, a sparging means 14, which preferably comprises a porous material, is positioned at the bottom of vessel 10 to admit finely-dispersed bubbles of carbon dioxide into said liquid 12. The sparging means 14 can be a disk of a porous, sintered material such as metal, glass, or polymeric particles. Preferably, the pores in the sparging means 14 will be suitably sized and spaced to provide effectively small and uniformly-dispersed bubbles of gas within the liquid 12 to achieve a desirably high rate of reaction which results in a porous product having the desired properties. Preferably, the pores in the sparging means 14 will have an average diameter within the range of from about 1 to about 150 microns. The use of a suitable sparging means such as a sintered metal disc, in accordance with the present invention provides a practically-high reaction rate in a simple bubbling process which achieves good gas liquid contact.

The carbon dioxide is introduced as finely-dispersed bubbles at a pressure above that existing within the pressurized vessel 10. Typically, the pressure differential between the inlet, such as by sparging means 14, and the interior of the vessel 10 will be at least about 0.1 psi, and will preferably be within the range of from about 0.2 to about 1.0 psi. The carbon dioxide is shown in the drawing to be transferred from tank 16 via line 18 to sparger 14. A flow meter device 20, is coupled with a flow rate monitor 22, to control the flow of carbon dioxide from tank 16 through line 18 to sparger 14. Vent valve 24 at the top of the pressurized vessel 10 is adjusted to permit constant withdrawal of gas from the vessel 10 to maintain a substantially constant pressure within said vessel. In this manner, a constant flow of carbon dioxide is maintained throughout the vertical extent of the pressurized vessel 10.

The pressure vessel 10 can be of any suitable construction capable of withstanding the pressures contemplated. It is preferably made of a material having good heat conductivity so that the temperature within the vessel can be efficiently controlled by the heat transfer medium (e.g. refrigerant) 26 surrounding the vessel 10. The heat transfer medium can be a suitable material such as ethanol, propylene glycol, ethylene glycol or the like. A separate temperature control unit (not shown) as is conventional in the art will be employed to maintain the temperature of the heat transfer medium 26 to the desired range. Accordingly, proper adjustment of the process must take into account this cooling effect.

The contact between the gas and the aqueous liquid are maintained for a period of time effective to form a gas hydrate suspended in the aqueous liquid. The exact time for hydrate formation at a sufficiently practical level for suitable gasified ice products, depends upon a number of factors including the pressure as described above, the concentration of solids within the aqueous liquid, the efficiency of heat withdrawal from the aqueous liquid, and the efficiency of contact between the gas and the aqueous liquid. Thus, there is no universal set of preferred contact times. Experience will show, however, that a particular reaction can be standardized to obtain a prediction of contact time for that specific reaction.

Because one of the objects of the invention is to prepare gasified ice products having relatively high gas contents, the contact between the gas and aqueous liquid is preferably maintained for a period of time effective to bring the hydrate forming reaction to within at least 50%, and preferably about 75%, of completion. When the temperature of the aqueous liquid begins to fall after reaching a maximum due to the evolution of heat at a rate greater than it is removed, the reaction is considered to be satisfactorily completed. To achieve the objects of the present invention, it is considered essential to maintain the temperature during the contact period at a level above the freezing point of the aqueous liquid, typically about 0° C. Preferably, the temperature of the aqueous liquid will be maintained throughout the period of contact with the gas, at approximately the equilibrium temperature for hydrate formation at the pressure employed. For practical purposes, the reaction can be considered stabilized where the temperature varies less than 5° C., and preferably less than about 2° C. below the equilibrium temperature.

In the preferred embodiment wherein carbon dioxide is contacted with the aqueous liquid to form $CO_2$ hydrate the contact will preferably be maintained for a period of time effective to form sufficient hydrate to produce products containing greater than 30, and up to about 70 milliliters of carbon dioxide per gram of product. While it is theoretically possible to achieve higher carbon dioxide contents, on the order of up to about 118 to 120 milliliters per gram of product, and these products are intended to be included within the scope of the invention, the most practical products will contain sufficient non-hydrated, carbon dioxide-saturated water to form a continuous frozen coating around the dispersed hydrate complexes and thereby protect these hydrate complexes from decomposition during storage.

Preferably, the carbon dioxide is introduced into the vessel 10 at a rate effective to provide a constant flow of minute bubbles from the sparger means 14 to the top surface of the liquid 12. While measurement of the bubble sizes is impossible, by observation they appear to be roughly within the range of from about 1 to about 5 millimeters in diameter. The preferred flow rates of gas are within the range of from about 0.5 to about 2.0 milliliters per second per square centimeter of sparger surface. At these flow rates, employing the preferred sparger means and the preferred pressures and temperatures, steady state operation can be achieved for the production of a high quality carbonated ice product, containing 60–70 ml of $CO_2$ per gram.

The sparging means 14 is located at the bottom of the reaction vessel. A dip tube 30 is shown extending to the bottom of the vessel 10 to withdraw the more dense, unreacted aqueous liquid after the reaction is brought to the desired degree of completion. Thus, in the embodiment shown, unreacted liquid above the sparging means 14 can be withdrawn by using a dip tube 30 and recycled for the next processing stage. As this liquid is withdrawn, further amounts of the more dense, unreacted liquid above the sparger may also separate out, by gravity, and be withdrawn. This permits the production of a carbonated ice product having a higher gas content, and also improves the uniformity of the product within the pressure vessel 10.

An advantage of the present invention is that the liquid can be both gasified to form the hydrate and frozen within a single vessel, and yet form a uniform product which is easily removed therefrom. While there is no criticality in the particular shape of the reaction vessel, it is preferably of a shape which permits uniform distribution of gas bubbles within the liquid upon introduction by sparger means 14. In terms of length and diameter ratio, it is presently preferred that the ratio of the vertical height to the diameter be within the range of about 1:1 to about 20:1.

After the desired degree of hydration, the hydrate must be recovered as a dispersed phase within a continuous matrix of slightly carbonated ice having a porous overall structure. To accomplish this, the vent valve is closed, isolating the vessel from the environment and the contents of the reactor 10 are then frozen, preferably right in the reaction vessel 10, by means of heat transfer liquid 26 which surrounds the reactor 10. As indicated, excess unreacted slightly carbonated water which is more dense than the reaction product can be removed by means of dip tube 30 prior to the freezing operation.

The freezing is preferably conducted under conditions of temperature and pressure which will maintain the contents of the reactor 10 within the region of stable hydrate according to the $CO_2$-water-hydrate phase diagram. The phase diagram was determined by H.W. Herreilers, Ph.D. Thesis, University of Amsterdam (1936). Any portion or all of the freezing may be conducted in a separate freezing vessel if desired. It is an advantage of the present invention, however, that because of the simplicity of the reactor, the reactor 10 can be economically employed also as a freezing chamber.

Freezing temperatures, whether done within the reactor 10 or a separate vessel, are typically below about $-3°$ C., and preferably within the range of from about $-5°$ to about $-12°$ C. The particular freezing time will depend upon many factors including the diameter of the reactor, the concentration of the hydrate slurry within the reactor, and the temperature of the heat transfer medium 26. Typically, however, freezing times on the order of from about 3 to about 4 hours are found effective. After the period of freezing, the product is simply removed from the vessel by opening the vessel either at the top or the bottom and then positioning it such that the weight of the material itself discharges the product.

The gasified ice product prepared according to the present invention is characterized by a granular, crystalline porous structure, a brittle texture, good stability in its frozen state, and the quiet and rapid evolution of gas when placed in aqueous liquid. In its broadest aspects, the product comprises a solid suspension of stable gas hydrate within a continuous matrix of solid ice, the product having a bulk density of less than about 0.60 grams per cubic centimeter. In other words, instead of the dense, non-porous products of the prior art which had densities of from about 0.90 to about 0.95 grams per cubic centimeter, the product of the present invention contains within individual pieces are formed, at least about 30% void space. Preferred products will contain from about 25 to about 45% void space, with the distribution thereof being fairly uniform throughout the product. Surprisingly, products of the invention having this porous structure are equally as stable as the dense products of the prior art, but yet are more rapidly soluble in water due to their high surface-to-liquid contact area. Therefore, they provide a more rapid release of carbon dioxide or other gas into the water in which it is to be dissolved. The porous structure permits water or other aqueous liquid to penetrate the interstices, and thereby present a greater surface area of water in contact with the gas-liberating ice to entrap the gas as it is released.

According to one preferred embodiment of the invention, the porous gasified ice product can be granulated. Because the product is desirably brittle, granulation can be accomplished by simple crushing to obtain a relatively uniform particle size distribution. This is an advantage over the prior art which required the use of equipment such as a grinder or a mill to comminute the carbonated ice products prior to shaping into briquettes. Not only is this a savings in capital equipment costs and energy supplied, but comminuting by crushing results in a product which is essentially dry and free flowing without the use of excessively low temperatures. The contrary is true with the prior art where the mechanical scraping and shaving of the ice product have the effect of partially melting the surface of the resulting small particles, requiring extremely close temperature control if a free-flowing granular product is the desired end product. The snow produced by conventional ice comminuting equipment was ideal for shaping into briquettes, but did not provide the ability to easily produce a granular carbonated ice product. The granular products of the present invention are preferably reduced to a fairly uniform particle size wherein at least 50 weight percent of the particles are between about 3–15 mm in diameter. A typical particle size distribution is such that about 70 weight % of the product has a particle size diameter between about 3–15 mm, 20% is between 15–30 mm and 10% is between about 30–60 mm. Products meeting these specifications show an extremely rapid and uniform release of gas when placed in an aqueous liquid.

The carbonated ice prepared in accordance with the present invention can be packaged in a suitable container such as a can or styrofoam cup. When packaged in containers of this type, the carbonated ice will provide a high degree of storage stability at ambient pressure and at temperatures within the range of from about $-5°$ to about $-20°$ C.

Along with the carbonated ice, in the same package or in a separate adjoining package, there may be provided a composition for preparing a soft drink such as the kind which comprises a color, flavor, an edible acidulent, and sweetener, all of these ingredients being present in amounts effective to provide the desired taste and eye appeal.

The following example is presented for the purpose of further illustrating and explaining the present invention and is not to be taken as limiting in any regard. Unless otherwise indicated, all parts and percentages are by weight.

EXAMPLE

A laboratory scale apparatus having the principal components illustrated in the FIGURE is employed to prepare a porous, carbonated ice product according to the invention.

A sintered metal, disc-shaped sparger 14, having a diameter almost equal to that of the reaction vessel 10, is installed near the bottom of the reaction vessel which in this case is a Parr bomb. The sintered metal sparger 14 comprises 100 square centimeters of surface area and has an average pore diameter size of about 30–40 microns. Carbon dioxide gas is fed from tank 16 through line 18 and to sparger 14 while being controlled by a turbine flow meter 20 and a flow rate monitor 22. Prior to starting the flow of carbon dioxide from tank 16, the reactor 10 is filled with 1000 milliliters of tap water. The reactor 10 and its contents are brought to a temperature of about 5° C. by a constant temperature bath 26 which contains ethylene glycol as the heat transfer liquid. The flow of carbon dioxide from tank 16 through sparger 14 is then started to achieve a pressure within the reactor 10 of about 500 psig. At this point, the outlet 24 is adjusted to provide a difference in pressure between the inlet at sparger 14 and the outlet at vent 24 of about 0.2 psi. The flow rate through line 18 is adjusted to a level of about 2.0 milliliters per second per square centimeter of sparger surface. The reaction is continued for a period of about 90 minutes after which the unreacted water (about 15 to 20% of the total volume) is withdrawn from the reactor 10 via dip tube 30. The temperature of the bath 26 is then brought to a temperature of about $-8°$ C. to freeze the contents of the reactor 10 over a period of about 3–4 hours. After freezing, the frozen carbonated ice is easily removed from the reactor 10 by simply pouring it out. The resulting product shows a bulk density of about 0.60 grams per cubic centimeter and contains about 60 milliliters of carbon dioxide per gram of product distributed fairly uniform throughout. Some of the product below the sparger, is relatively dense and hard and has a popping effect, but can be easily physically separated from the remainder of the high quality product.

The above description is for the purpose of teaching the person skilled in the art how to practice the present invention. This description is not intended to detail all of the obvious modifications and variations of the invention which will become apparent to the skilled worker upon reading. However, applicants do intend to include all such obvious modifications and variations within the scope of their invention which is defined by the following claims.

We claim:

1. A process for preparing gasified ice characterized by a granular, crystalline porous structure, a brittle texture, good stability in its frozen state, and the ability to rapidly and quietly release its gas content to aqueous solution upon melting, which process comprises:
   a. maintaining aqueous liquid in a pressurized vessel under conditions of temperature and pressure effective to form a stable gas hydrate upon contact with a conditionally-stable-hydrate-forming gas;
   b. introducing finely-dispersed bubbles of a conditionally-stable-hydrate-forming gas into said aqueous liquid, at a pressure above that within said vessel to contact said liquid with said gas;
   c. constantly withdrawing gas from said vessel to maintain a substantially constant pressure within said vessel;
   d. maintaining said contact for a period of time effective to form a suspension comprising gas hydrate dispersed within said liquid;
   e. freezing said suspension under pressure; and
   f. separating unreacted aqueous liquid from said vessel prior to freezing.

2. A process according to claim 1 wherein said finely-dispersed bubbles of said gas are admitted to said vessel through a porous sparging means positioned near the bottom of said vessel.

3. A process according to claim 1 wherein the pores in said sparging means have an average diameter within the range of from about 1 to about 150 microns.

4. A process according to claim 1 wherein the conditionally-stable-hydrate-forming gas is introduced into said vessel at a rate within the range of from about 0.5 to about 2.0 milliliters per second per square centimeter of sparger surface.

* * * * *